United States Patent
Komili et al.

(10) Patent No.: US 8,695,091 B2
(45) Date of Patent: Apr. 8, 2014

(54) SYSTEMS AND METHODS FOR ENFORCING POLICIES FOR PROXY WEBSITE DETECTION USING ADVERTISING ACCOUNT ID

(75) Inventors: Onur Komili, Vancouver (CA); Kyle J. Zeeuwen, Vancouver (CA)

(73) Assignee: Sophos Limited, Abingdon Oxfordshire (GB)

( * ) Notice: Subject to any disclaimer, the term of this patent is extended or adjusted under 35 U.S.C. 154(b) by 177 days.

(21) Appl. No.: 12/369,096

(22) Filed: Feb. 11, 2009

(65) Prior Publication Data

US 2010/0205665 A1      Aug. 12, 2010

(51) Int. Cl.
*G06F 21/00*      (2013.01)

(52) U.S. Cl.
USPC .............. 726/22; 726/12; 726/23; 726/24; 726/26; 726/27; 705/14.4; 705/14.47; 705/14.49; 705/14.69; 705/14.73

(58) Field of Classification Search
USPC ........................................................ 726/12
See application file for complete search history.

(56) References Cited

U.S. PATENT DOCUMENTS

| | | | |
|---|---|---|---|
| 5,961,593 A | 10/1999 | Gabber et al. | |
| 7,334,126 B1 * | 2/2008 | Gilmore et al. | 713/168 |
| 7,472,422 B1 * | 12/2008 | Agbabian | 726/25 |
| 7,587,762 B2 | 9/2009 | Singhal et al. | |
| 7,735,116 B1 * | 6/2010 | Gauvin | 726/2 |
| 2003/0163372 A1 * | 8/2003 | Kolsy | 705/14 |
| 2005/0235030 A1 | 10/2005 | Lauckhart et al. | |
| 2006/0069614 A1 * | 3/2006 | Agarwal et al. | 705/14 |
| 2006/0211416 A1 | 9/2006 | Snyder et al. | |
| 2006/0253458 A1 * | 11/2006 | Dixon et al. | 707/10 |
| 2007/0300286 A1 * | 12/2007 | Judge | 726/1 |
| 2008/0028465 A1 * | 1/2008 | Bantz et al. | 726/22 |
| 2008/0201722 A1 | 8/2008 | Sarathy | |
| 2009/0094175 A1 * | 4/2009 | Provos et al. | 706/12 |
| 2009/0307360 A1 | 12/2009 | Ianchici et al. | |
| 2010/0205297 A1 | 8/2010 | Sarathy | |

* cited by examiner

*Primary Examiner* — Jung Kim
*Assistant Examiner* — Adrian Stoica
(74) *Attorney, Agent, or Firm* — Strategic Patents, P.C.

(57) ABSTRACT

In embodiments of the present invention improved capabilities are described for systems and methods that enforce policies with respect to proxy communications.

19 Claims, 6 Drawing Sheets

SYSTEMS AND METHODS FOR ENFORCING POLICIES FOR PROXY WEBSITE DETECTION USING ADVERTISING ACCOUNT ID

BACKGROUND

Proxy servers can enable indirect communications between network participants. Proxy servers can modify these communications so as to insert content, remove content, obscure a sender or receiver of the communications, and so on.

Security policies, administrative policies, and the like may be directed at limiting access to certain websites or network content.

There exists a need for systems and methods that enforce policies with respect to proxy communications.

SUMMARY

Embodiments of the present invention include systems and methods that enforce policies with respect to proxy communications. In embodiments, the present invention may be a computer program product embodied in a computer readable medium that, when executing on one or more computers, enforces policies with respect to proxy communications.

In one aspect, a method and computer program product for identifying a proxy website that is disclosed herein includes analyzing website content that is retrieved based on a website request, wherein the analysis involves looking for patterns within the website content that are similar to patterns found in a known non-proxy website's content; in response to finding a similar pattern between the requested website and the known non-proxy website, comparing the requested website's identifier with an identifier of the known non-proxy website; and in response to finding a mismatch between the two website identifiers, categorizing at least a portion of the requested website's identifier as a suspected proxy website identifier. The known non-proxy website may be one of a plurality of known non-proxy websites that have been predetermined as known non-proxy websites. Signature content from the plurality of known non-proxy websites may be stored in a database and the analysis involves retrieving the signature content and comparing the signature content to content derived from the retrieved website. The signature content may be prioritized based on the non-proxy websites popularity such that more popular signature content is used in the analysis before less popular content. The step of analyzing the website content that may be retrieved based on the website request further comprises analyzing a plurality of content, retrieved based on a plurality of requests made by the requested website, for a significant number of content portions that include patterns matching the known non-proxy website. The step of categorizing at least a portion of the requested website's identifier as a suspect proxy website identifier may involve determining a longest common portion of URLs requested by the requested website and categorizing the longest common portion as indicative of a proxy website. The step of looking for patterns within the website content that may be similar to patterns found in the known non-proxy website's content involves comparing text associated with the two websites for similarities. The step of looking for patterns within the website content that may be similar to patterns found in the known non-proxy website's content involves comparing copyright messages associated with the two websites for similarities. The step of looking for patterns within the website content that may be similar to patterns found in the known non-proxy website's content involves comparing comments within HTML associated with the two websites for similarities. The step of looking for patterns within the website content that may be similar to patterns found in the known non-proxy website's content involves comparing class names associated with the two websites for similarities. The step of looking for patterns within the website content that may be similar to patterns found in the known non-proxy website's content involves comparing script components associated with the two websites for similarities. The step of looking for patterns within the website content that may be similar to patterns found in the known non-proxy website's content involves comparing images associated with the two websites for similarities. The step of looking for patterns within the website content that may be similar to patterns found in the known non-proxy website's content involves comparing links associated with the two websites for similarities. The step of looking for patterns within the website content that may be similar to patterns found in the known non-proxy website's content involves comparing style elements associated with the two websites for similarities. The step of looking for patterns within the website content that may be similar to patterns found in the known non-proxy website's content involves comparing client side executable content associated with the two websites for similarities. The step of looking for patterns within the website content that may be similar to patterns found in the known non-proxy website's content involves comparing elements within HTTP headers returned by a server associated with the two websites for similarities.

In one aspect, a method of identifying a proxy website that is disclosed herein includes analyzing website content that is retrieved based on a website request, wherein the analysis involves looking for patterns within the website content that are similar to patterns found in a known non-proxy website's content, wherein the patterns are characterized as checksums; in response to finding a similar pattern between the requested website and the known non-proxy website, comparing the requested website's identifier with an identifier of the known non-proxy website; and in response to finding a mismatch between the two website identifiers, categorizing at least a portion of the requested website's identifier as a suspected proxy website identifier.

In one aspect, a method of identifying a proxy website that is disclosed herein includes intercepting a website request; analyzing website content that is retrieved based on the website request, wherein the analysis involves looking for patterns within the website content that are similar to patterns found in a known non-proxy website's content; in response to finding a similar pattern between the requested website and the known non-proxy website, comparing the requested website's identifier with an identifier of the known non-proxy website; and in response to finding a mismatch between the two website identifiers, blocking a requester that initiated the website request from interacting with the requested website.

In one aspect, a method of identifying a proxy website that is disclosed herein includes intercepting a website request; analyzing website content that is retrieved based on the website request, wherein the analysis involves looking for patterns within the website content that are similar to patterns found in a known non-proxy website's content; in response to finding a similar pattern between the requested website and the known non-proxy website, comparing the requested website's identifier with an identifier of the known non-proxy website; in response to finding a mismatch between the two website identifiers, analyzing the requested website content for patterns matching a known proxy website; and blocking a requester that initiated the website request from interacting with the requested website.

In one aspect, a method of identifying and categorizing proxy websites that is disclosed herein includes crawling the web to identify a target website; analyzing website content associated with the target website, wherein the analysis involves looking for patterns within the website content that are similar to patterns found in a known non-proxy website's content; in response to finding a similar pattern between the requested website and the known non-proxy website, comparing the requested website's identifier with an identifier of the known non-proxy website; and in response to finding a mismatch between the two website identifiers, categorizing at least a portion of the requested website's identifier as a suspected proxy website identifier and storing the at least a portion of the requested website's identifier in a database.

In one aspect, a method of identifying a proxy website that is disclosed herein includes analyzing website content that is retrieved based on a website request, wherein the analysis involves looking for patterns within the website content that are similar to patterns found in a known proxy website's content, wherein the patterns are characterized as checksums; and in response to finding a similar checksum between a portion of the requested website and a portion of the known proxy website, determining that portion of the requested website as suspicious.

In one aspect, a method and computer program product that is disclosed herein includes intercepting a universal resource locator (URL) request from a client computing facility; interpreting terms in the URL to identify that the URL was produced by a search engine in response to a search; and interpreting the terms in the URL to identify that the search was directed towards locating a blocked category of website. The category of blocked website may be a proxy site. The category of blocked website may be an adult site category. The category of blocked website may be a blocked category. The category of blocked website may be an allowed category. The category of blocked website may be a safe category. The category of blocked website may be a suspicious category. The category of blocked website may be a gaming category. The category of blocked website may be a social networking category. The category of blocked website may be a job search category. The category of blocked website may be an ecommerce category.

In one aspect, a method that is disclosed herein includes intercepting a universal resource locator (URL) request from a client computing facility; interpreting characters in the URL to identify that the URL was produced by a search engine in response to a search; and interpreting the characters in the URL to identify that the search was directed towards locating a blocked category of website.

In one aspect, a method that is disclosed herein includes intercepting a universal resource locator (URL) request from a client computing facility; interpreting terms in the URL to identify that the URL was produced by a search engine in response to a search; and interpreting the terms in the URL to identify that the search was directed towards locating a blocked website.

In one aspect, a method of blocking proxy website interactions that is disclosed herein includes intercepting a universal resource locator (URL) request from a client computing facility; analyzing the characters that comprise the URL; and in response to a finding that the URL was produced by a search engine software program and directed to a search request for a proxy site, blocking access to search results based on the URL. The step of analyzing the characters that may include the URL involves detecting keywords in the URL and comparing the keywords to a database of suspicious keywords to find a match. The step of analyzing the characters that may include the URL involves detecting strings of characters that match a string of characters typical of a search engine. The step of analyzing the characters that may include the URL involves detecting strings of characters that match a string of characters typical of a proxy website identification search. The step of analyzing the characters that may include the URL involves detecting regular expressions that match a regular expression typical of a search engine. The regular expression may involve prefix matching. The regular expression may involve suffix matching. The regular expression may involve wildcard matching. The regular expression may involve substitution matching. The step of analyzing the characters that may include the URL is performed on the client computing facility. The step of analyzing the characters that may include the URL is performed on a network resource associated with the client computing facility.

In one aspect, a method of blocking proxy website interactions that is disclosed herein includes intercepting a universal resource locator (URL) request from a client computing facility; analyzing the characters that comprise the URL; in response to a finding that the URL was produced by a search engine software program and directed to a search request for a proxy site, allowing access to the search results based on the URL; and identifying the access to the search results based on the URL to a systems administrator for further analysis.

In one aspect, a method and computer program product that is disclosed herein includes intercepting a website connection request; analyzing a requested website associated with the website connection request for operator identification information; associating the operator information with an entity that operates a known website; and categorizing the requested website as a same category as the known website. The same category may be a proxy site category. The same category may be an adult site category. The same category may be a blocked category. The same category may be an allowed category. The same category may be a safe category. The same category may be a suspicious category. The same category may be a gaming category. The same category may be a social networking category. The same category may be a job search category. The same category may be an ecommerce category.

In one aspect, a method that is disclosed herein includes intercepting a website connection request; analyzing a website associated with the website connection request for operator identification information; and associating the operator information with an entity that operates a known proxy website.

In one aspect, a method of blocking a proxy website interaction that is disclosed herein includes intercepting a website connection request; analyzing a website associated with the website connection request for customer advertisement identification information; associating the customer advertisement identification information with an entity that operates a known proxy website; and blocking the website connection request.

In one aspect, a method of identifying a proxy website that is disclosed herein includes intercepting a website connection request; analyzing a website associated with the website connection request for customer advertisement identification information; associating the customer advertisement identification information with an entity that operates a known proxy website; and identifying the website as a proxy website.

In one aspect, a method that is disclosed herein includes identifying an advertisement identifier as potentially being owned by a proxy site operator; analyzing a website for the presence of the advertisement identifier; in response to identifying the advertisement identifier as associated with the website, inferring that the website is a proxy site.

In one aspect, a method of identifying a proxy website that is disclosed herein includes intercepting a website connection request; analyzing a website associated with the website connection request for customer advertisement identification information; associating the customer advertisement identification information with an entity that operates a known proxy website; and identifying the website as a suspected proxy website.

In one aspect, a method of identifying a proxy website that is disclosed herein includes intercepting a website connection request; analyzing a website associated with the website connection request for customer advertisement identification information; associating the customer advertisement identification information with an entity that operates a known proxy website; analyzing the website for suspicious content indicative of a potential proxy site; and in response to the identification of the entity that operates a known proxy site and an identification of the suspicious content, identifying the website as a proxy website.

In one aspect, a method of identifying an operator of a website that is disclosed herein includes analyzing a plurality of websites for customer advertisement identification information; identifying customer advertisement identification information for each of the plurality of websites; and grouping into subsets of the plurality of websites by common customer advertisement identification information. The method of identifying an operator of a website may include the particular type of website may be a proxy website. The particular type of website may be a website known for producing malware. The particular type of website may be an adult website. The particular type of website may be a gaming website. The particular type of website may be a social networking website.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
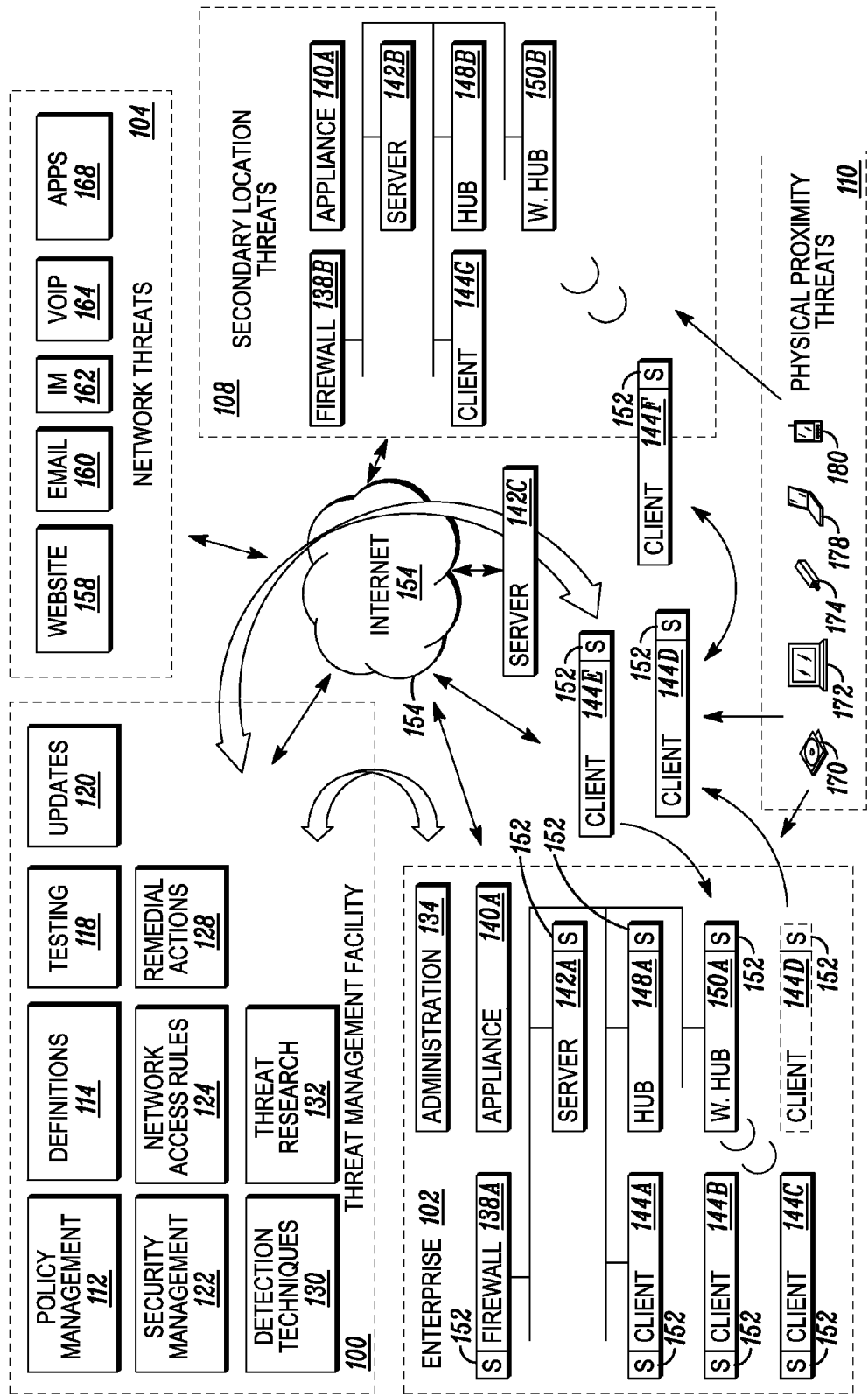
FIG. 1 depicts a block diagram of a threat management facility providing protection to an enterprise against a plurality of threats.

FIG. 1 depicts a block diagram of a threat management facility providing protection to an enterprise against a plurality of threats. An aspect of the present invention relates to corporate policy management and their implementation through a unified threat management facility 100. As will be explained in more detail below, a threat management facility 100 is used to protect computer assets from many threats, both computer generated threats and user generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100

Over recent years, malware has become a major problem across the internet 154. From both technical and user perspectives the categorization of a specific threat type, such as whether it is a virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly, say within 10 minutes, which may require acceleration for the delivery of threat protection. Where once, monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include enterprise facility 102 client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly with the threat management facility 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including end-point security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URL filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URLs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the distribution of enterprise facility 102 wide access rules and policies that may maintain control of the access of client facility 144 to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a standalone application, may be part of the policy management facility 112, network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The IDE definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the network access rules facility 124. The network access rules facility 124 may be maintained by the network administration facility 134 using the network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, DNS server facility 210, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like, such as a user's desktop computer as an end-point computer, a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, DNS server facility 210, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facility 142, such as application servers 142, communications servers 142, file servers 142, database servers 142, proxy servers 142, mail servers 142, fax servers 142, game servers 142, web servers 142, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URL filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144 extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise facility 102 client facility 144 equipped with an end-point computer security facility 152, but in embodiments, as long as the mobile client facility 144 is embedded with an end-point computer security facility 152, as described above, threats may have no better success than if the mobile client facility 144 where inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility 102 clients 144 that may be connected to the secondary location's 108 network. In this instance, these computer components may now unknowingly spread a threat to other components connected to the network.

Some threats may not come directly from the Internet 154, such as from non-enterprise facility 102 controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of embodiments that apply policies to proxy communications. It should be understood that the following embodiments may be managed through a threat management facility 100 along with other services, such as those described herein.

It should be understood that, in embodiments, a web gateway may include a security facility 152. In this context, the security facility 152 may in effect eavesdrop on requests and responses that pass through the web gateway. As appropriate and in accordance with one or more policies, the security facility 152 may cause the gateway to drop certain incoming requests, drop certain incoming responses, prevent the retransmission of requests or responses, transmit any of a variety of messages or alerts, and so on. This is described in detail herein and elsewhere.

In some embodiments, client computers or other computing facilities may include the security facility 152. This is described in greater detail hereinabove with reference to FIG. 1 and elsewhere.

Proxy communications may involve a proxy server. The server 142C may be a proxy server outside of the enterprise 102. In some embodiments, the proxy server 142C may be a so-called "anonymizer" that allows a user to indirectly access network content outside of the enterprise 102. In embodiments, the network content may include websites, web services, any and all data files or data streams, and so on. In any case, the indirect access may enable a user to access the network content via alternate URLs that are directed at the proxy server 142C rather than source servers for the content. Throughout this disclosure, proxy servers and anonymizers may be referred to interchangeably except where otherwise stated or clear from the context.

Some security applications, such as and without limitation parental control type applications, may be directed at restricting access to network content. To perform their intended function, these applications may need to function in a network environment that includes proxy servers.

In embodiments, the present invention may identify a plurality of website categories, such as content-based categories, security categories, and the like. For instance, content-based categories may include adult/sexually explicit, advertisements & pop-ups, alcohol & tobacco, arts, blogs & forums, business, chat, computing & internet, criminal activity, downloads, education, entertainment, fashion & beauty, finance & investment, food & dining, gambling, games, government, hacking, health & medicine, hobbies & recreation, hosting sites, illegal drugs, infrastructure, intimate apparel & swimwear, intolerance & hate, job search & career development, kid's sites, motor vehicles, news, peer-to-peer, personals and dating, philanthropic & professional organizations, phishing & fraud, photo searches, politics, proxies & translators, real estate, reference, religion, ringtones/mobile phone downloads, search engines, sex education, shopping, society & culture, spam URLs, sports, spyware, streaming media, tasteless & offensive, travel, violence, weapons, web-based e-mail, custom (user defined), uncategorized, and the like. For instance, security categories may include potentially unwanted application (PUA)/adware, other/mistyped, PUA/system monitor, other/potentially exploited, PUA/remote, admin tool, pornography/porn, PUA/hacking tool, PUA/other, entertainment/banking, entertainment/games, entertainment/other, communication/cell phones, entertainment/shopping, PUA/dialer, entertainment/sports, entertainment/youth, spam/Chinese, media/ads, spam/drugs, media/news, spam/mortgage, media/TV, spam/other, search/job search, spam/product, spam/Russian, spam/stock, spam/survey, illegal/child abuse, illegal/child pornography, illegal/cracked or pirated software, malware/rat repository, illegal/criminal activities, malware/reference, and the like.

A variety of proxy servers are described herein and still others will be appreciated. In practice, proxy servers may act as anonymizers, may insert advertising into network content, may act as a man in the middle that captures sensitive information such as user names and passwords, and so on. Generally, security applications may detect proxy servers, may monitor or block communications involving proxy servers, and so on. This is described in greater detail hereinafter and elsewhere.

In embodiments, proxy servers 142C may be provided by profit-seeking entities ("proxy providers") that generate advertising revenue by inserting advertising into network content. For example and without limitation, a user may request a web page from a proxy server by submitting an alternate URL to the proxy server. The proxy server may receive the alternate URL, convert it to a primary URL, and then request the web page from a web server by submitting the primary URL to the web server. In response to the request, the web server may return the web page to the proxy server 142C. The proxy server 142C may then insert one or more advertisements into the web page before returning the web page to the user. When the user views or interacts with at least one of the advertisements, advertising revenue (typically from an advertising network such as Google AdSense, AdBrite, or the like) may be credited to an owner or operator of the proxy server.

In embodiments, the crediting of advertising revenue depends upon a unique account identifier that is embedded within the web page. This identifier may be communicated to the advertising network when the user views or interacts with an advertisement. Having received this identifier, the advertising network may credit advertising revenue to the entity that delivered the advertisement to the user.

In practice, the advertising network may require that the unique account identifier within the web page be encoded in the clear, without deliberate obfuscation or encryption. Moreover, the advertising network may require that only one account identifier be associated with each profit-seeking entity.

Policies, such as and without limitation those policies described hereinabove and elsewhere, may dictate that any and all communications with proxy servers 142C should be blocked.

Security facilities 152 or the like may eavesdrop on communications of computing facilities within an enterprise 102. Upon recognizing an outbound communication to a proxy server 142C, these security facilities 152 may block the outbound communication in accordance with a policy. In some embodiments, recognizing the outbound communication may include extracting a unique account identifier from the communication and matching that identifier to a database of identifiers that are known to be associated with proxy providers.

In some embodiments, the threat management facility 100 may include a database that contains associations between account identifiers and proxy providers. From time to time, these associations may be communicated to any and all of the security facilities 152. In some embodiments, any of the security facilities 152 may maintain a local cache or the like of at least some of the associations. Additionally or alternatively, in some embodiments any of the security facilities 152 may submit a unique account identifier in a query to the threat management facility 100, which provides an affirmative or negative response depending upon whether or not the unique account identifier is known by the threat management facility 100 to be associated with a proxy provider.

In some embodiments, the database containing associations between account identifiers and proxy providers may be updated via manual entries, automated proactive web scanning systems, and so on. It will be understood that a variety of such web scanning systems are possible, and all such systems are within the scope of the present disclosure.

Figure 2:
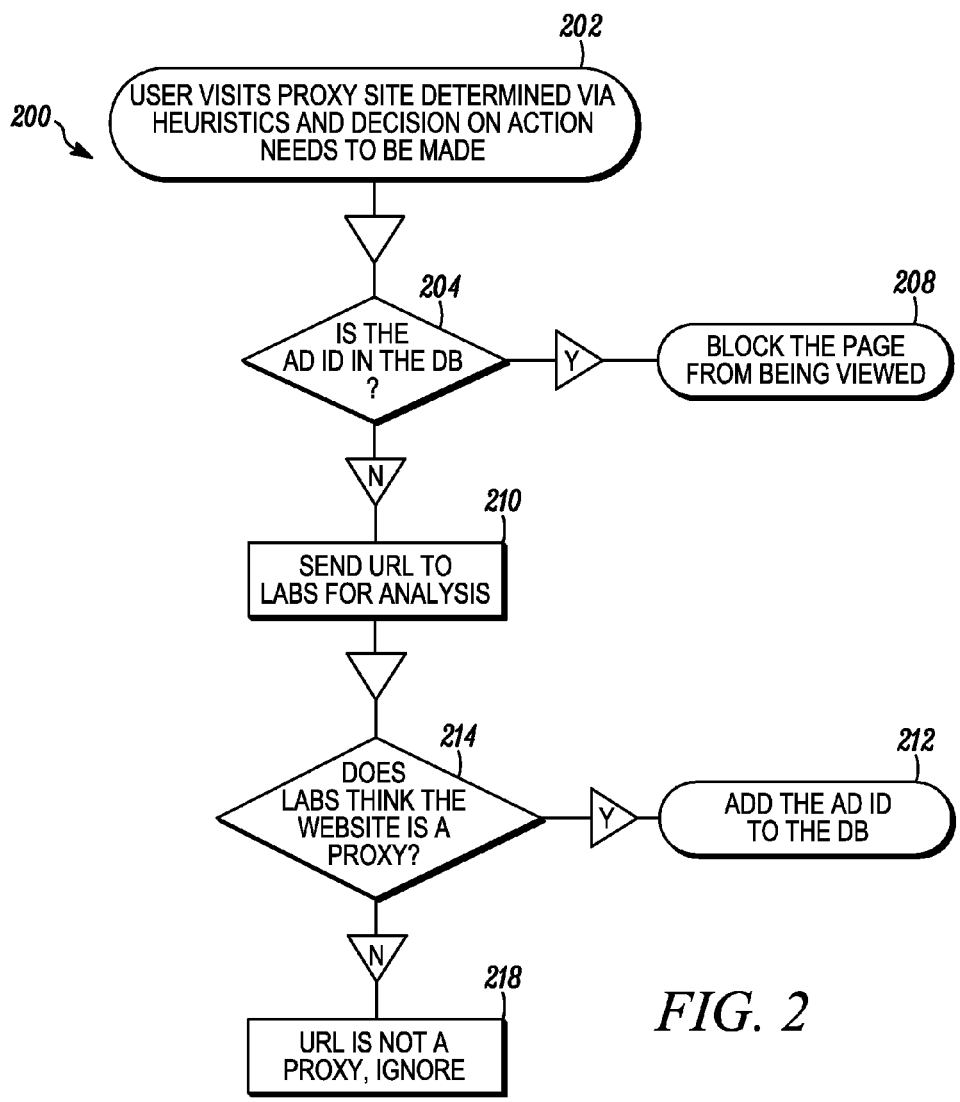
FIG. 2 depicts a method for enforcing a policy that prohibits communications from a proxy server.

FIG. 2 depicts a method for enforcing a policy that prohibits communications through a proxy server. The method 200 begins at block 202, where a user of a computing facility accesses network content at an alternate URL. A security facility 152 observes this and eavesdrops on the network content in transit to the computing facility. As discussed hereinabove, in practice an account identifier may be present in the network content and may be readily accessible by the security facility 152.

As shown by block 204, the security facility 152 may check to see if the account identifier exists in a database of account identifiers. As discussed hereinabove, in embodiments the database may exist within the security facility 152, within the management facility 100, partially within the security facility 152 and partially within the management facility 100, and so on. Also as discussed hereinabove, checking to see if the account identifier exists in the database may involve direct database access via a database query, indirect database access via a query to a remote system that itself queries the database, and so on. It will be understood that a variety of such embodiments are possible.

If the account identifier is in the database, the method 200 proceeds to block 208. Here, the security facility 152 blocks access to the network content. It will be understood that a variety of techniques may be employed to block the network content. These techniques may include, without limitation, simply not allowing the network content to transit the security facility 152, disabling or reconfiguring an application, disabling or reconfiguring a logical or physical network port, transmitting an appropriate message, and so on.

However, if the account identifier is not in the database, the method 200 proceeds to block 210. Here, the URL may be transmitted to a laboratory for analysis. In embodiments, the laboratory may include the threat management facility 100 or any other facility adapted to receive URLs for analysis.

Analysis of the URL may be conducted as shown by block 212. The analysis may be directed at determining whether the URL refers to a proxy server 142C. In some embodiments, the analysis may include accessing the network content at the URL, extracting an account identifier from the network content, and looking up the account identifier in a database of account identifiers that are known or suspected to be associated with proxy providers. In some embodiments, the analysis may include looking up the URL in a database of known or suspected proxy servers. In some embodiments, the analysis may include inspecting page structure and content of the network content. Generally, it will be understood that a variety of analytical systems and methods may be applied to determine whether the URL refers to a proxy server 142C.

If the laboratory's analysis of the URL indicates that the URL refers to a proxy server 142C, the process 200 may continue to block 214. Here, an account identifier from within the network content is added to a database of account identifiers of known or suspected proxy providers. Alternatively, the URL may be flagged and stored in a database for further review.

If the laboratory's analysis does not indicate an association between the URL and a proxy server then the process 200 may continue to block 218 where the URL is ignored.

Although the above examples and descriptions of the method 200 relate to proxy servers, the method 200 is not limited to applications involving proxy servers. For example and without limitation, an owner/operator of websites may run a number of adult-oriented websites at some number of domains. Once the owner/operator's account identifier becomes known, any domains or URLs found to contain that account identifier could be grouped together by owner/operator. Since in this example the owner/operator is known to be associated with adult-oriented websites, such domains or URLs may also be categorized (if even provisionally so) as being adult-oriented. This categorization may be stored in a database or the like, and may be used in the enforcement of policies directed at adult-oriented websites. Thus, generally, the method 200 may be employed to group domains or URLs together by account identifier, to associate owner/operators with domains or URLs, to categorize domains or URLs, and so on.

Continuing on, embodiments of the present invention may identify proxy servers by recognizing a mismatch between a first URL of network content and an expected URL of the network content. Having so identified a proxy server, policies that relate to proxy server usage may be employed with respect to the first URL and the network content from it. In some embodiments, these policies may be directed at blocking requests for the network content at the first URL.

For example and without limitation, network content from Facebook may have an expected URL that includes the domain facebook.com. When network content from Facebook appears at a first URL that does not contain the domain facebook.com, embodiments may identify or suspect the first URL to be that of a proxy server. Thenceforth, a security facility 152 or the like that enforces the policy may recognize and block requests for network content at the first URL. A variety of other such examples will be appreciated, including without limitation examples relating to social networking sites, gaming/downloading sites, inappropriate/adult content sites, banking sites, and so on.

In order to recognize the mismatch, a variety of techniques may be employed to detect that the network content from the first URL in fact originates from another URL (i.e., the expected URL). For example, in practice websites typically contain a number of pages sharing a substantially consistent look and feel. This consistency may be preserved as a page is processed and forwarded by a proxy server. When this is the case, the look and feel may be reflected in common characteristics observable by a scanning mechanism at a security facility 152. In embodiments the common characteristics may be associated with the expected URL and may include text such as page titles, copyright messages, and the like; specific HTML structuring and layout; comments within HTML; common attributes, class names, script components, and so on; specific image files used as page decoration, particularly and without limitation so-called "favicons"—small graphical icons used within browsers that are closely tied to a particular website, organization, or brand; links that may not have been translated by the proxy server; style elements, style sheets, or the like; client-side executable content such as and without limitation JavaScript; elements within HTTP headers returned by a server from which the proxy server received the network content; and so on.

In some embodiments, a virus detection application may determine that network content from one URL in fact originates from another URL. Generally, the virus detection application may process network content in search of data that matches genes or identities of viruses. However, in such embodiments, genes or identities that match observed characteristics of known websites may be created and processed by the virus detection application as well. Matches according to these genes or identities may indicate that network content originates from a known website. Generally, this may be referred to herein and elsewhere as gene-based detection.

Yet another technique may be employed to identify URLs that are associated with proxy servers. This technique may involve crawling a large number of popular websites to produce a database of fingerprints for each of the websites. Such crawling may occur from time to time. In some embodiments, the fingerprints may include a checksum, a "fuzzy" or approximate fingerprint, and so on. In any case, the fingerprints, checksums, or the like may be stored in a database, which may be published from time to time. For example and without limitation, the threat management facility 100 may contain the database and may publish it to one or more of the security facilities 152. In some embodiments, the database may be published to subscribers that have paid for (or otherwise have provided consideration for) the database. In any case, this technique may be referred to herein and elsewhere as fuzzy fingerprinting.

Throughout this disclosure and elsewhere, a checksum may be calculated in a variety of ways, using any and all techniques for calculating a checksum applied to any and all portions of a website.

In some embodiments, web pages may be decomposed into page-level "objects" by parsing HTML/XML/script content of the web pages. Each object and its relationship to the overall page may have a structural uniqueness. For example, it should be appreciated that a page's structure may be represented as a tree of page-level objects. Each object in the tree has a unique position within it, and this may relate to the structural uniqueness. For another example, it should be appreciated that, when displayed or rendered into a frame buffer, each (X,Y)-pixel in the page may be set according to one or more objects that are layered according to a Z-component or the like. In any case, based upon the structural uniqueness, any and all of the objects (or aspects thereof) may be identified. Once identified, a checksum of the objects may be calculated.

In some embodiments, certain response headers such as cookie headers or the like may be extracted. Once extracted, a checksum of these headers could be calculated.

In some embodiments, specific keywords or phrases could be matched using a fuzzy or simple substring matching on the entire web page. A checksum could then be calculated on these matched keywords or phrases.

It will be understood that a variety of embodiments for calculating a checksum of a website are possible.

In some embodiments, communications with an uncategorized website may be monitored for the presence of the fingerprints. When a detection threshold is exceeded, the website may be suspected of being an unauthorized republication of a genuine website. In practice, such republication of a website may be provided by a proxy server, a malicious website, or the like. For example and without limitation, an uncategorized website may provide numerous instances of network content that match fingerprints that are in the fingerprint database and that are known from web crawling to be associated with facebook.com. As a result, the uncategorized website may be re-categorized as suspicious, as a web proxy, or the like. Similarly, if the network content is in the fingerprint database and known to be associated with a bank, the uncategorized website may be categorized as a source of potential phishing attacks. A variety of other such examples will be appreciated.

When an unauthorized republication of a website is detected, all of the URLs associated with that website may be examined for a longest common prefix. For example and without limitation, the unauthorized republication may be associated with three URLs: http://www.example.com/foo/bar; http://www.example.com/foo/foo; and http://www.example.com/foo/baz. In this example, the longest common prefix is http://www.example.com/foo. In embodiments, the longest common prefix may be stored in a database and communicated to security facilities 152. In some embodiments, any and all URLs beginning with the longest common prefix may be deemed URLs of unauthorized reproductions of network content.

When an unauthorized reproduction of a website is suspected, a confidence level may be assigned to that suspicion. In embodiments, the confidence level may be stored in a database, communicated to security facilities, and so on.

Depending upon the confidence level, a variety of actions may be taken when URLs associated with the reproduction are accessed. Such actions may without limitation include blocking a request to the network resource at the URL, blocking a response from the network resource at the URL, logging such requests or responses, and so on.

When the confidence level rises to a sufficient level, the URLs may be added to a list of detected proxy sites. A user may review this list for false positives, and provide an indication of the false positives. In some embodiments, this review may take place via a web browser with checkbox or other input elements for receiving the input. A variety of such embodiments will be understood.

In some embodiments, an indication of the detection of an unauthorized reproduction and the confidence level may be communicated to the threat management facility 100 for further analysis or distribution to security facilities 152.

Figure 3:
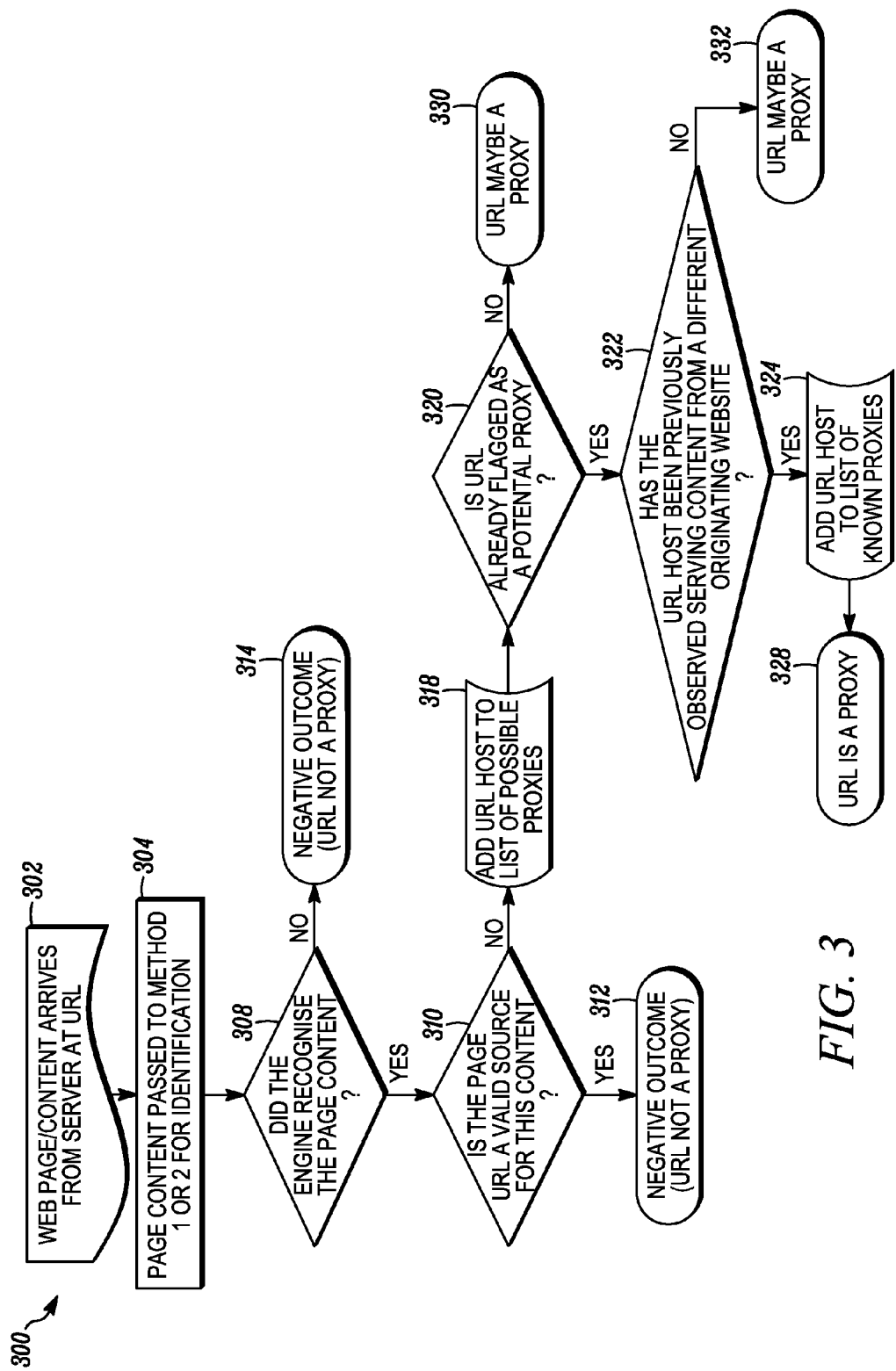
FIG. 3 depicts a method of detecting proxies.

FIG. 3 depicts a method of detecting proxies. The method 300 begins at block 302 where network content from a server arrives from a server at a URL. In block 304 the network content may be processed by a method that identifies an anonymizer or by a method that identifies the origin of web content, as described hereinabove or elsewhere. Any of a number of systems and methods may be employed to detect content. Two of these methods are described herein and elsewhere as gene-based detection (method 1) and fuzzy fingerprinting (method 2). In any case, when network content is recognized, the test at block 308 produces a positive result and the method 300 continues to block 310. Otherwise, the source of the network content is not a proxy and the method 300 ends at block 314.

At block 310, a test determines whether the network content's URL is valid. If it is, the source of the network content is not a proxy and the method 300 ends at block 312. However, if the network content's URL is invalid (e.g., when the network content is known to originate from another URL) then the URL may be added to a list of possible proxies, as shown by block 318. From there, a test determines whether the URL is already flagged as a potential proxy (block 320). If it is not already flagged, the URL may be that of a proxy and an appropriate result is returned at block 330. On the other hand, when the URL is already flagged, another test (block 322) may determine whether the URL's host has been previously observed serving content from a different originating website. If not, the URL may be that of a proxy and an appropriate result is returned at block 332. If so, the URL is probably a proxy and an appropriate result is returned at block 328.

Figure 4:
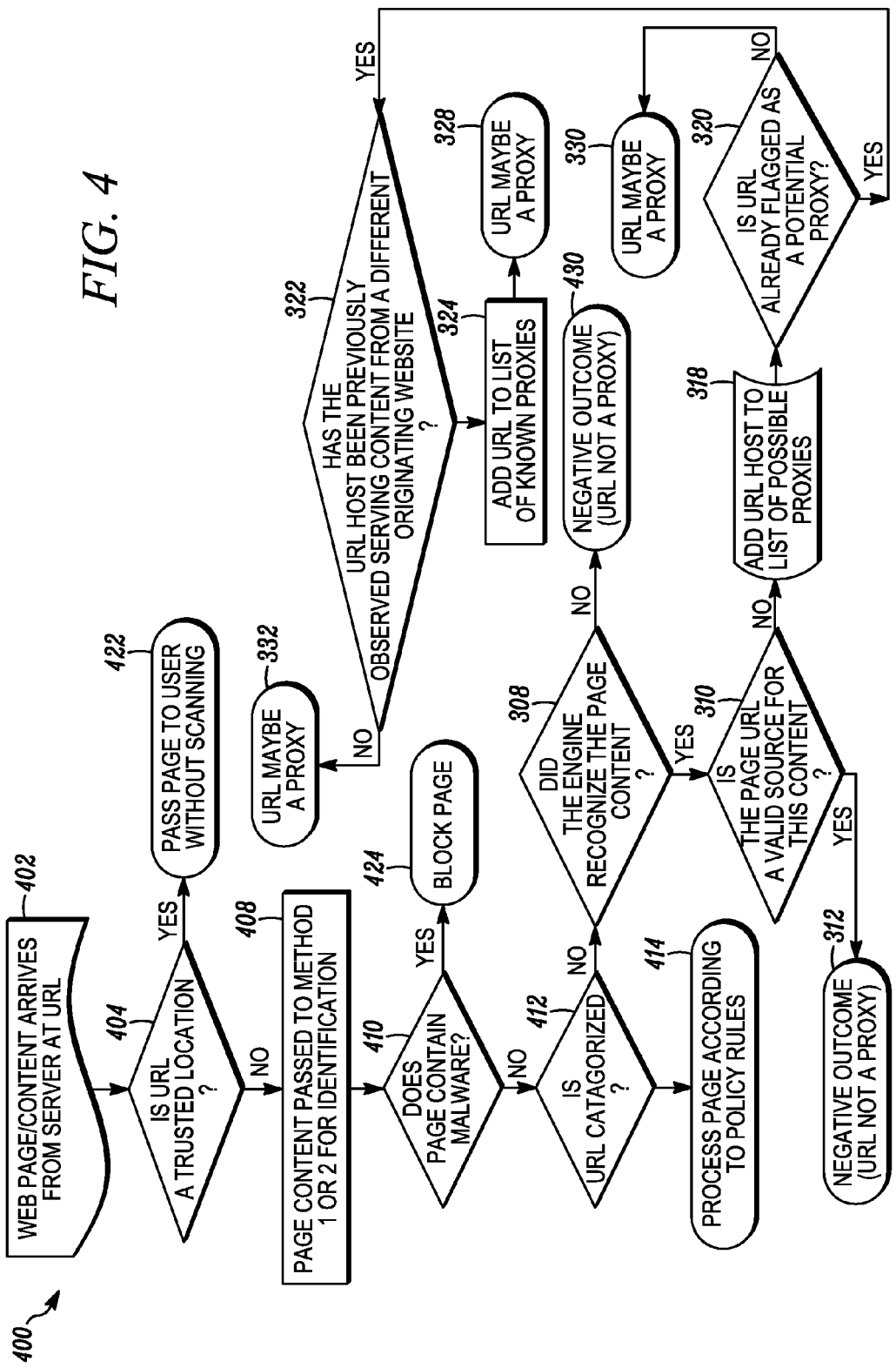
FIG. 4 depicts a method of detecting proxies.

FIG. 4 depicts a method of detecting proxies. The method 400 begins at block 402 where network content arrives from a server at a URL. If the URL is a trusted location then the network content is passed along to a requesting client or user as shown by the path through block 404 to block 422. Otherwise, as shown by block 408, the network content may be processed by a method that identifies content, such as and without limitation gene-based detection (method 1) or fuzzy fingerprinting (method 2). If either of these methods determines that the network content contains malware, then delivery or operation of the network content may be blocked as shown by the path through block 410 to block 424. Otherwise, the test at block 410 returns a negative result and the method 400 continues to block 412.

If the URL is categorized, then the network content may be processed according to policy rules relating to the URL's category (as shown by the path through 412 to 414). However, if the URL is not categorized, then the method 400 may continue with block 308 as described hereinabove with reference to FIG. 3.

Figure 5:
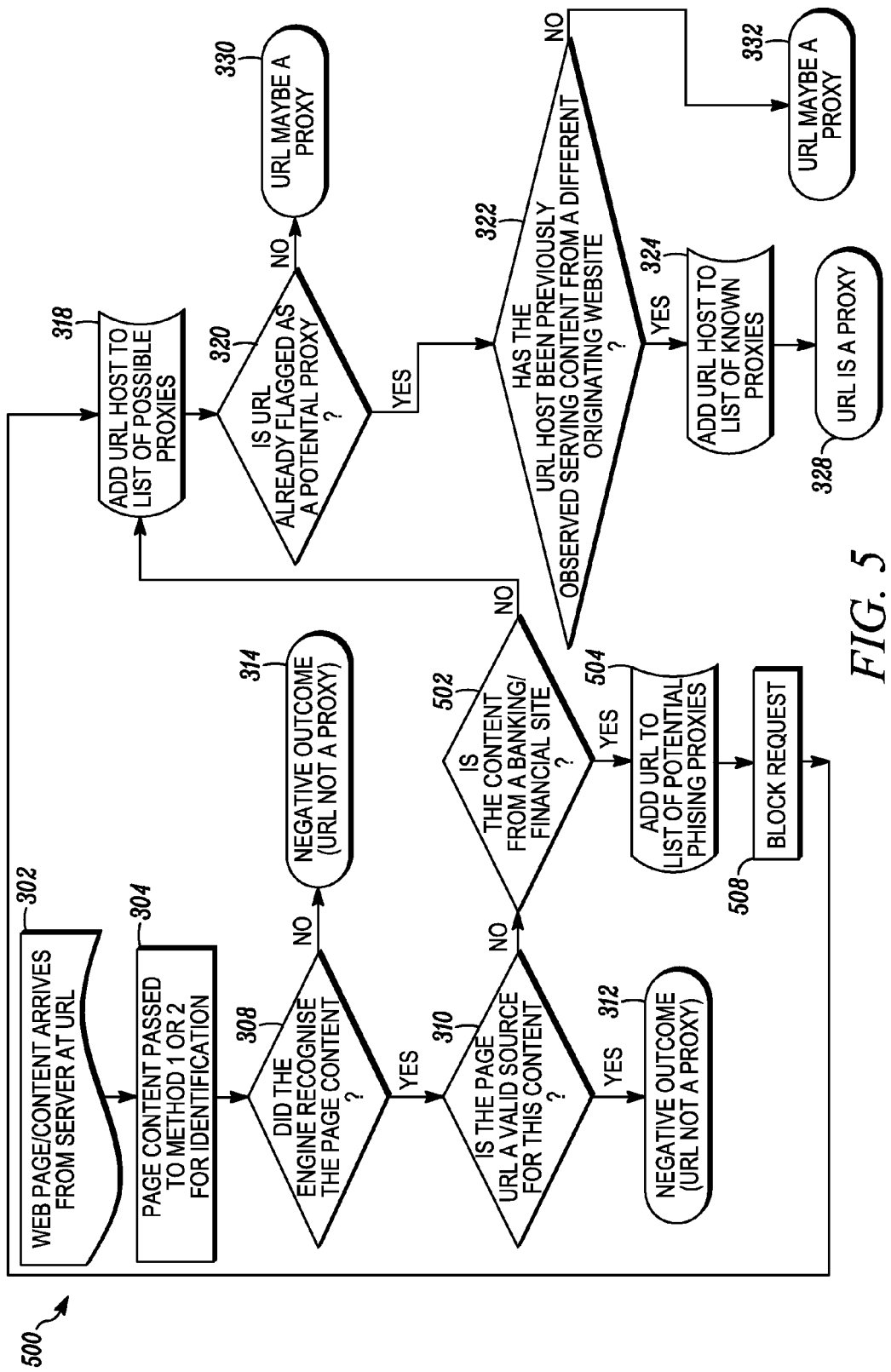
FIG. 5 depicts a method of detecting proxies and suspected phishing sites.

FIG. 5 depicts a method of detecting proxies and suspected phishing sites. The method 500 begins from block 302 and proceeds in the same manner as the method 300 described hereinabove with reference to FIG. 3, except as follows: When the test at block 310 produces a negative result, the method 500 proceeds to block 520 where a test determines whether the network content is from a backing or financial website. If it is, then the URL of the website is added to a list of potential phishing sites as shown by block 504. Then, the network content and any request associated with it may be blocked as shown by block 508. From here, as from the negative branch from block 502, the method 500 may continue to block 318, which is described in detail hereinabove.

In practice, users may learn of proxy servers via a web search engine. In some embodiments, a security facility 152 may block searches containing search terms that are related to finding a proxy server. For example and without limitation, the security facility 152 may block a search phrase containing the terms "proxy" or "unblock facebook" or the like.

A database within the threat management facility 100 or the security facility 152 may contain disallowed search keywords. In embodiments, the database may contain keywords that are provided by a manufacturer or provider of the threat management facility 100 or security facility 152. In some embodiments, the database may contain user-provided keywords.

In embodiments, searches may be submitted to search engines via a URL that contains the search phrase. Major search engines use established domain names in their URLs (e.g., google.com yahoo.com, et cetera) and such URLs may be singled out for processing. The processing may examine these URLs for disallowed keywords.

For example and without limitation, the following URL may be singled out on the basis of the domain name (google.com); subsequent processing of the URL may reveal the keyword "proxy":

http://www.google.com/search?hl=en&q=proxy&btnG=Google+Search&meta=

A variety of techniques for processing such URLs will be appreciated. All such techniques are intended to fall within the scope of the present disclosure.

In some embodiments, the database may include regular expressions that match disallowed search keywords or disallowed search URLs. The regular expressions may be directed at prefix matching, suffix matching, wildcard/substitution matching, and so on.

Figure 6:
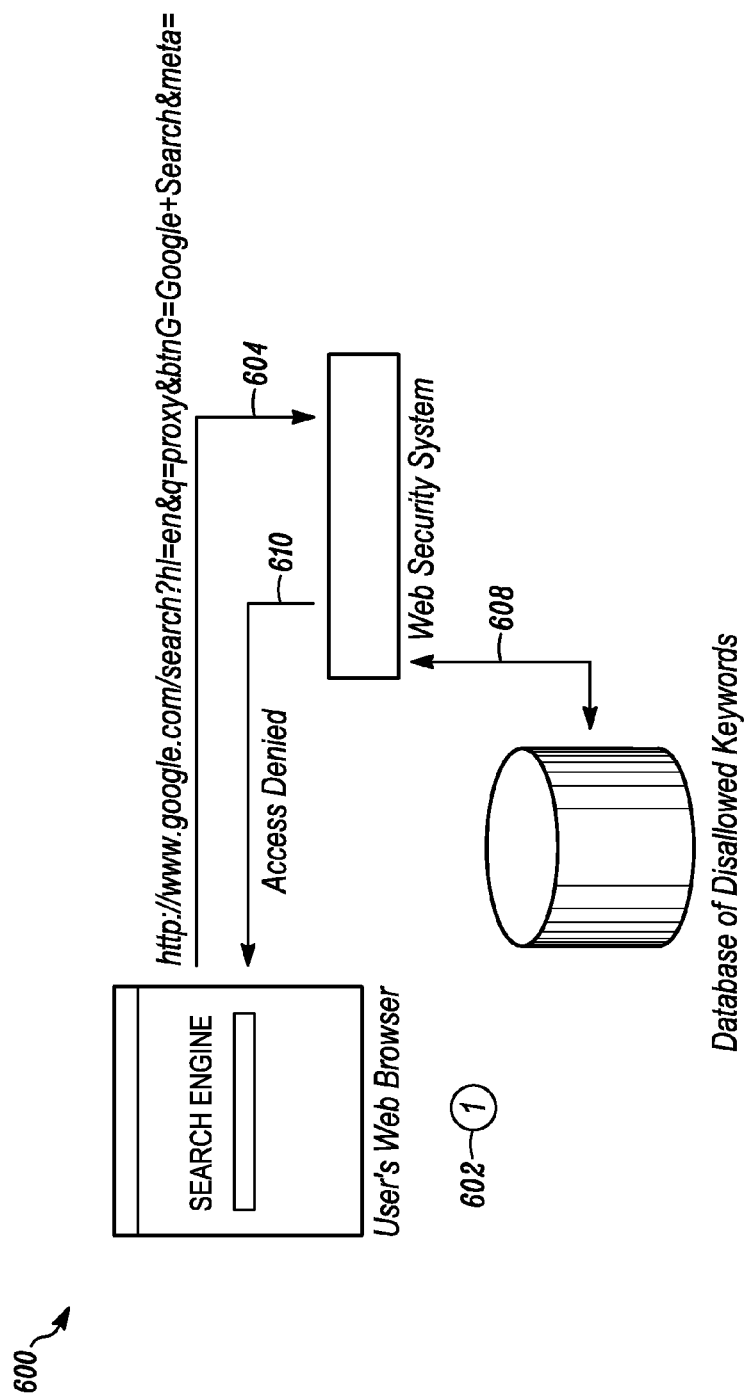
FIG. 6 depicts a method of selectively blocking access to a search engine.

FIG. 6 depicts a method of selectively blocking access to a search engine. In particular, this method 600 may disallow queries containing certain keywords, matching certain regular expressions, or the like. The method begins with a user 602 entering a search word or search phrase into a search engine input screen. This screen may include a web browser window, an applet window, or the like. It will be understood that a variety of embodiments of the screen are possible. In any case, the user's input may be translated into a URL that contains the search word or search phrase.

Next, as shown by the transition 604, the URL may be transmitted to a web security system. This system may, without limitation, include a security facility 152.

Then, as shown by the transition 608, the following may occur: The web security system may extract keywords from the URL and then query a database to see if these keywords are disallowed. The database may respond as appropriate. In some embodiments, the database may be integral to the web security system.

In some embodiments, the database may be a separate application from the web security system. In some embodiments, the web security system may locally or remotely access the database. Still other embodiments of the database will be appreciated.

When the web security systems determines that one or more of the keywords in the URL as disallowed, the web security system may transmit an "access denied" message or the like (transition 610). In some embodiments, this message may include an HTML status code such as "403 Forbidden," "404 Not Found," and so on. It will be understood that a variety of embodiments of the message are possible.

Regarding all of the foregoing, some embodiments of the present invention may categorize a website with the same category by identifying operator identification information. This information may include an account identifier, as described hereinabove and elsewhere. Without limitation, a website may be categorized as a proxy, an adult website, a blocked website, an allowed, website, a gaming website, a social networking website, a safe website, a job search website, an ecommerce website, and so on. Depending upon the categorization, in some embodiments, communications with the website may be blocked or allowed; an alert may be triggered; the categorization or related communications may be logged; another site-type detection action may be initiated; and so on.

Some embodiments of the present invention may identify a proxy site by discovering the operator identification information. Without limitation, the proxy site may serve a reproduction of an adult website, a blocked website, an allowed website, a gaming website, a social network website, a safe website, a job search website, an ecommerce website, and so on. Depending upon the identification, in some embodiments, communications with the website may be blocked or allowed; an alert may be triggered; the identification or related communications may be logged; another site-type detection action may be initiated; and so on.

Some embodiments of the present invention may identify a proxy site by discovering advertising identification information, which may include an account identifier. Without limitation, the proxy site may serve a reproduction of an adult website, a blocked website, an allowed website, a gaming website, a social network website, a safe website, a job search website, an ecommerce website, and so on. Depending upon the identification, in some embodiments, communications with the website may be blocked or allowed; an alert may be triggered; the identification or related communications may be logged; another site-type detection action may be initiated; and so on.

Some embodiments of the present invention may identify a blocked category of website based on a search engine request URL. The blocked category may include a proxy category, an adult category, a gaming category, a social network category, a safe category, a job search category, an ecommerce category, and so on. Depending upon the category, in some embodiments, communications with the search engine may be blocked or allowed; an alert may be triggered; the category of the website or related communications may be logged; another site-type detection action may be initiated; and so on.

Some embodiments of the present invention may identify a blocked website based in a search engine request URL. The blocked website may be served by a proxy server; may be an adult, gaming, social networking, safe, job search, or ecommerce website; and so on. In some embodiments, communications with the blocked website may be blocked or allowed; may trigger an alert; may be logged; may initiate another site-type detection action; and so on.

Some embodiments of the present invention may categorize a proxy website based upon similarities between the network content it delivers and the network content delivered that a non-proxy website delivers. The proxy website may be served by a proxy server and may include network content that is blocked or allowed, that is designated as safe, or that is associated with gaming, social networking, job searching, ecommerce, and so on. In some embodiments, communications with the proxy website may be blocked or allowed, may trigger an alert, may be logged, may initiate another site-type detection action, and so on.

Some embodiments of the present invention may identify portions of websites as suspicious based upon a checksum comparison with proxy sites. The portions of the websites may be served by a proxy server and may include network content that is blocked or allowed, that is designated as safe, or that is associated with gaming, social networking, job searching, ecommerce, and so on. In some embodiments, communications related to the portions of the websites may be blocked or allowed, may trigger an alert, may be logged, may initiate another site-type detection action, and so on.

Some embodiments of the present invention may detect uncategorized web-based proxy sites by identifying an embedded secondary URL. A proxy server may embed this secondary URL into network content. For example and without limitation the secondary URL may be enable advertising from which an owner/operator of the proxy server profits. In any case, the network content or the secondary URL may be associated with adult content, blocked content, allowed content, gaming content, social networking content, safe content, job search content, ecommerce content, and so on. In some embodiments, communications including the secondary URL or related to the web-based proxy sites may be blocked or allowed, may trigger an alert, may be logged, may initiate another site-type detection action, and so on.

Embodiments of the present invention may apply virus detection techniques to identify websites; apply "fuzzy" document fingerprinting techniques to identify web content; and compare the result of the foregoing with an associated URL to make a determination about the validity of the web content's origin. Embodiments may be directed at detecting other abuses of known websites. For example and without limitation, detection of phishing attacks, cyber squatters, or typo squatters may be detected. A variety of applications will be appreciated, and all such applications are intended to fall within the scope of the present disclosure.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium for preventing proxy website interactions that, when executing on one or more computers, performs the steps of:
    intercepting a website connection request from a client to access a requested website;
    analyzing the requested website associated with the website connection request to identify customer advertisement identification information within the requested website, wherein the customer advertisement identification information includes a unique account identifier embedded within a web page of the requested website in order to allocate advertising revenue for an interaction with an advertisement within the web page;
    determining that the customer advertisement identification information is associated with an entity known to operate an anonymizer used to access web content by receiving an alternate URL from the client, converting the alternate URL to a primary URL, requesting a web page by submitting the primary URL from the anonymizer to a web server, and returning web content in the web page from the anonymizer to the client, thereby providing a determination; and
    categorizing the requested website as the anonymizer based on the determination.

2. The computer program product of claim 1, further comprising code that performs the step of blocking access to the requested website by the client.

3. The computer program product of claim 1, further comprising code that performs the step of allowing connection by the client to the requested website.

4. The computer program product of claim 1, further comprising code that performs the step of sending an alert to a threat management facility.

5. The computer program product of claim 4 further comprising code that performs the step of sending an alert to an administrator for an enterprise network that includes the client.

6. The computer program product of claim 4 further comprising code that performs the step of sending an alert to the client.

7. The computer program product of claim 1 wherein the client is associated with an enterprise network.

8. The computer program product of claim 7 wherein the enterprise network includes a threat management facility.

9. The computer program product of claim 1, further comprising code that performs the step of blocking access to the requested website by a number of clients associated with an enterprise network.

10. The computer program product of claim 1 further comprising code that performs the step of causing a remedial action to be performed on the client.

11. The computer program product of claim 10 wherein the remedial action includes a malicious code scan of the client.

12. The computer program product of claim 10 wherein the remedial action includes terminating an application executing on the client.

13. The computer program product of claim 10 wherein the remedial action includes isolating the client.

14. The computer program product of claim 10 wherein the remedial action includes monitoring streaming data through a gateway.

15. The computer program product of claim 1 wherein the client is a personal computer.

16. The computer program product of claim 1 wherein the client is coupled to an enterprise network.

17. The computer program product of claim 16 wherein the anonymizer provides indirect access to network content outside the enterprise network via an alternate URL directed at the anonymizer rather than a source server for the network content.

18. The computer program product of claim 1 further comprising code that comprises accessing a database that contains associations between a number of customer advertisement identifiers and a number of anonymizers.

19. The computer program product of claim 1 further comprising code that performs the step of initiating a site-type detection action on the requested website.

* * * * *